United States Patent Office 2,756,657
Patented July 31, 1956

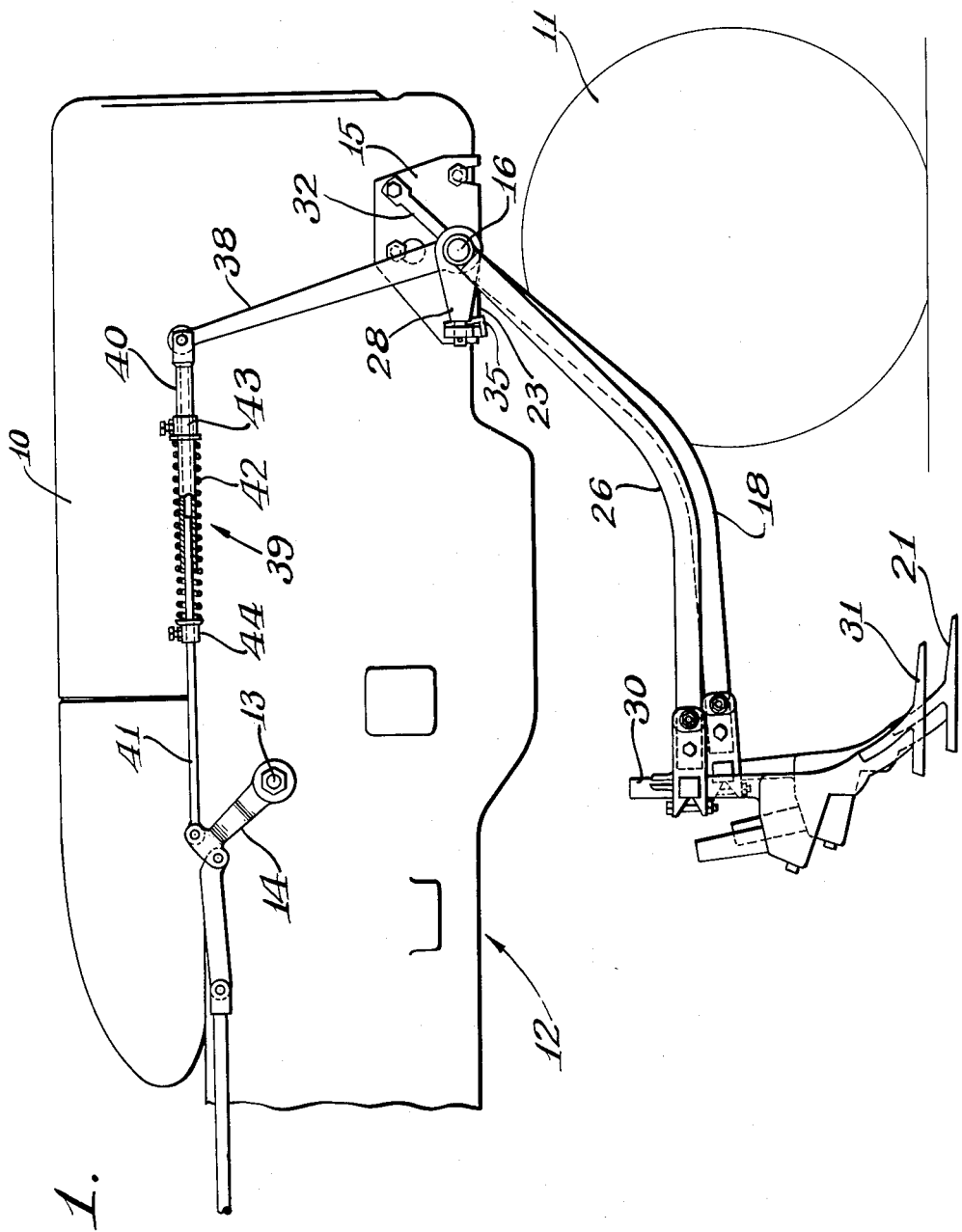

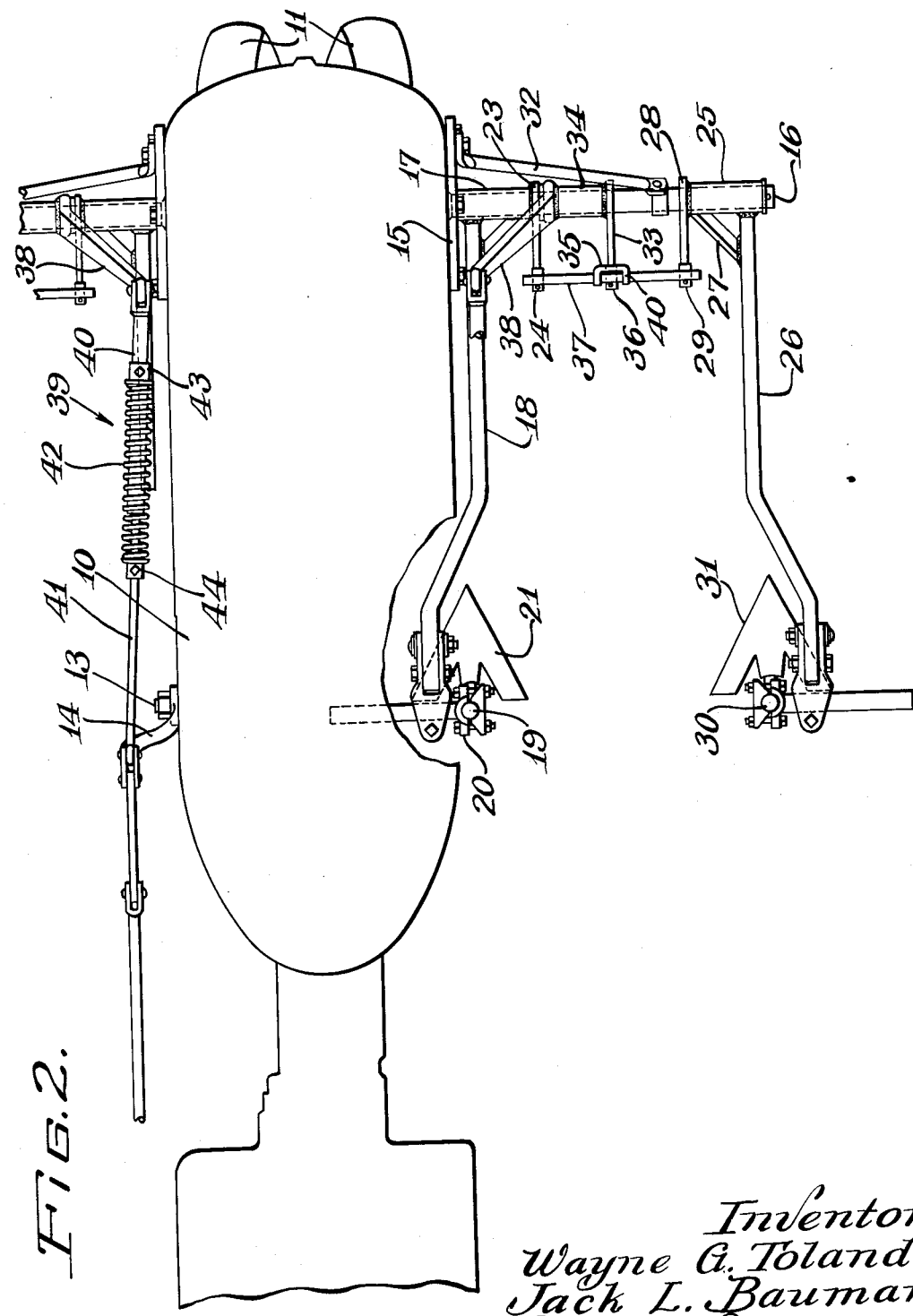

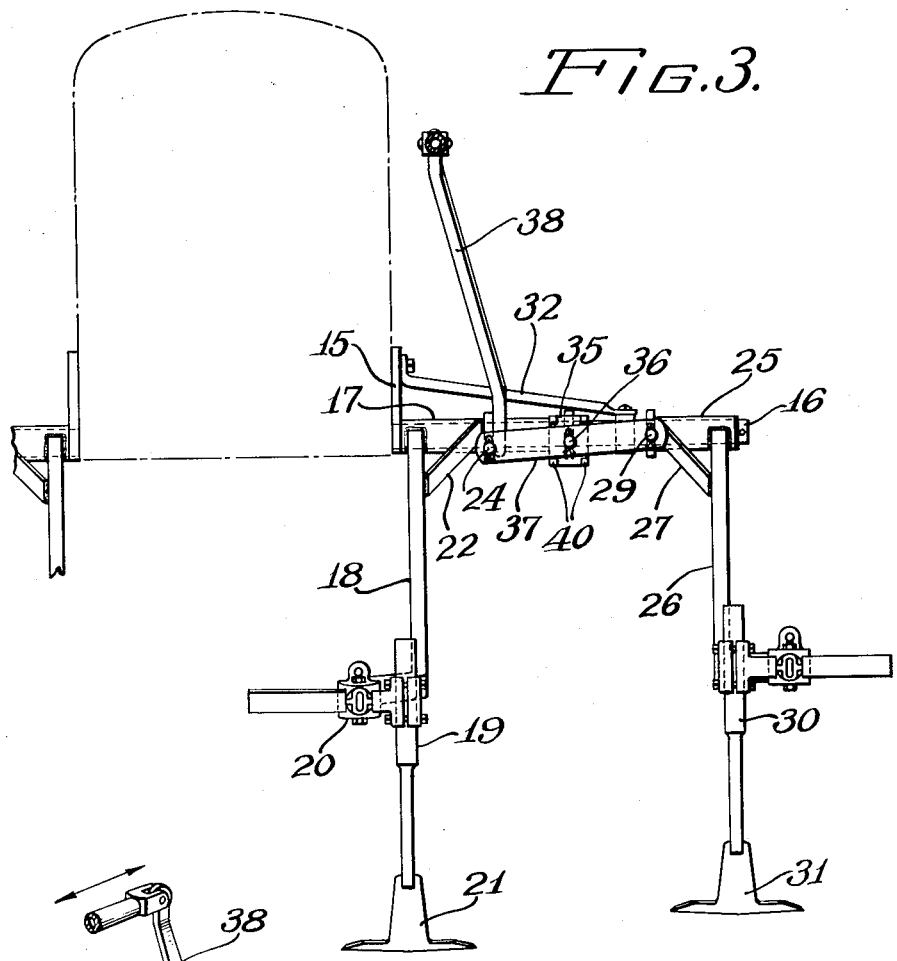
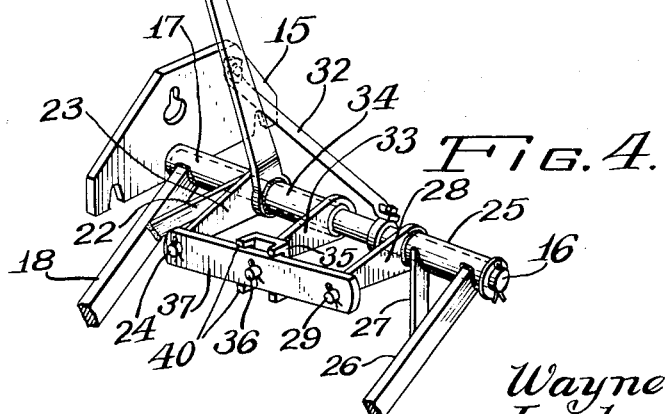

2,756,657

TRACTOR CULTIVATOR

Wayne G. Toland and Jack L. Bauman, Canton, Ill., assignors to International Harvester Company, a corporation of New Jersey Application December 7, 1951, Serial No. 260,484

5 Claims. (Cl. 97—47.34)

This invention relates to agricultural implements and particularly to cultivators. More specifically, the invention concerns a tractor-mounted cultivator.

Cultivators which are mounted upon the tractor between the front and rear wheels frequently are so complex in the arrangement of parts of the implement and of the means for controlling it from the tractor, that the operator's vision of the working area is impaired. Customarily, cultivating tools are mounted upon supporting means which project laterally from opposite sides of the tractor so that earth working units may be mounted on each side of the tractor body for operating upon a plurality of rows of a growing crop. At each side of the tractor, spaced tool gangs straddle a crop row and cultivate the earth between adjacent rows. When the implement is raised to transport position it is frequently desirable that the outermost gang of tools be raised to a somewhat higher level than the inner gang.

An object of the present invention, therefore, is the provision of an improved tractor-mounted cultivator of simplified construction providing maximum visibility of the working area for the tractor operator.

Another object of the invention is the provision of an improved tractor-mounted cultivator comprising laterally spaced gangs and means by which the laterally outer gang may be caused to rise to a higher elevation than the inner gang.

A further object of the invention is the provision of an improved tractor-mounted cultivator wherein laterally spaced gangs of tools are so mounted that each has limited floating movement relative to the other in the operating position of the tools in order to compensate for variations in ground contour.

Another object of the invention is to provide in a tractor-mounted cultivator improved lifting means for raising the tools to transport position on the tractor while accommodating relative movement between the gangs of tools.

Other objects and advantages of the invention will become clear from the following detailed description when read in conjunction with the accompanying drawings wherein:

Fig. 1 is a view in side elevation of the forward end of a tractor having mounted thereupon a cultivator embodying the features of this invention.

Fig. 2 is a plan view similar to Fig. 1 with parts removed for clarity and with a part of the tractor broken away to show the position of the laterally inner gang of tools.

Fig. 3 shows a schematic representation of the tractor body in end elevation with the right-hand earth working tools mounted thereupon and illustrating mechanism providing for relative movement of the tool gangs in operating position, and Fig. 4 is a detail in perspective of the tool bar and manner of connecting the tool gangs thereto.

Referring to the drawings, the numeral 10 designates the body of a tractor having dirigible front wheels 11 and rear drive wheels, not shown. The tractor is provided with the usual power plant designated at 12 providing power for rocking a shaft 13 upon which is mounted an arm 14 serving a purpose which will hereinafter appear.

Mounted upon the side of the tractor is an attaching plate 15 having affixed thereto as by welding and extending laterally therefrom, a tool bar 16. This tool bar serves as the support for a pair of earth working gangs, one of which is mounted on each side of the tractor body. Since the gangs of tools on each side of the tractor are substantial duplicates, a description of one will suffice for both.

Mounted upon the inner end of the tool bar 16 and adjacent the plate 15 is a sleeve 17 which is pivoted upon the tool bar and has secured thereto, as by welding, and extending rearwardly and downwardly therefrom a tool beam or drag link 18, the rear portion of which is bent to a position generally parallel with the ground, as indicated in Fig. 1, and at its rear end is bent laterally inwardly to provide a support for a tool standard 19 adjustably secured to the drag link by a clamp 20 and having attached to its lower end an earth penetrating shovel 21. The drag link 18 is braced by a cross-piece 22 fixed to the sleeve 17 and to the link. Likewise affixed to the sleeve 17 and extending rearwardly therefrom is an arm 23, which terminates in a rounded pivot portion 24, the function of which will hereinafter become clear.

Upon the outer end of the tool bar 16 is pivotally mounted a sleeve 25 to which is secured and extending rearwardly therefrom a drag link 26 similar to drag link 18, and parallel thereto also braced by a cross-piece 27. Another arm 28, affixed to sleeve 25 and extending rearwardly therefrom parallel to arm 23, terminates in a pivot portion 29 similar to pivot portion 24. At this point it should be clear that tool-carrying beams or drag links 18 and 26 are independently mounted upon the transversely extending tool bar 16 for vertical swinging movement about the tool bar as an axis. It will also be observed that the laterally inwardly bent portion of the beam 18 extends under the tractor body and that the outer drag link 26 has its rear end bent outwardly to provide for mounting thereupon a standard 30 carrying at its lower end a cultivating tool 31. The entire assembly of the tool bar 16 and plate 15 is attached to the tractor body, and the tool bar is braced by means of a cross-piece 32.

It has been previously pointed out that it is not only desirable for the laterally spaced earth working units to float independently in operating position to a limited extent but also that the laterally outer gang be elevated somewhat higher than the inner tool gang when the implement is raised to transport position. This is accomplished by mechanism including a lift arm 33 affixed and extending rearwardly from a sleeve 34 mounted upon the tool bar 16 between the sleeves 17 and 25. Lift arm 33 is substantially parallel to the arms 23 and 28 and is provided at its rear end with an upright plate or socket member 35 having a centrally disposed and rearwardly projecting pivot pin 36 secured thereto. Pin 36 is received in a somewhat oversize aperture provided medially of the ends of a transverse member in the form of an equalizing bar 37, the ends of which are likewise provided with somewhat oversize apertures to receive for pivotal movement therein the respective pivot ends 24 and 29 of arms 23 and 28. At this point it should be clear that the sleeves 17, 25 and 34 on tool bar 16 are capable of independent pivotal or rocking movement thereon. Furthermore it should be observed that by virtue of the connection of arm 33 to the tool beams 18 and 26 through the intermediary of the equalizing bar 27, rocking movement of the arm 33 will result in vertical swinging movement of the tool beams 18 and 26 about their axes on the bar 16. It should be further noted that while swinging of the arm 33 will lift both of the tool-supporting beams, they are still capable of independent swinging movement by virtue of the interconnection thereof through the equalizer bar 37.

Rocking of the lift arm 33 to raise and lower the earth working tools is accomplished by the provision of a lever or arm 38 also affixed to the sleeve 34 and forming a unit with the latter sleeve and the arm 33. Forward and rearward swinging of the lever 38 results in vertical movement of the tool beams 18 and 26. Forward and rearward movement of the lever 38 is accomplished by the connection thereto of a push rod generally indicated at 39.

Push rod 39 comprises a sleeve portion 40 pivotally connected to the lever 38 at its upper end and a rod 41 having its forward end slidably received in the sleeve 40 and its rear end pivotally connected to the power lift rock arm 14 on the side of the tractor. Push rod 39 is made flexible by the provision of an extension spring 42, one end of which is secured to a collar 43 adjustably mounted on the sleeve 40 and the other end of which is secured to a collar 44 adjustably mounted on the rod portion 41. Since the spring 42 operates in extension it is constantly urging the lever 38 to rock in a counterclockwise direction, as viewed in Fig. 1, so that the earth working tools are biased to ground-engaging position, and upward movement of these tools is against the action of the spring.

Since the tool supports 18 and 26 are independently mounted on the tool bar 16 and connected by the equalizer bar 37 which accommodates this independent movement, upon lifting the tools to transport position and engagement of the underside of the tractor by the laterally inner beam 18, the operation of the lever 38 to lift the tools continues to function and effect further lifting of the laterally outer beam 26. This relative movement, however, is limited by the provision of vertically and laterally spaced pairs of lugs 40 projecting rearwardly from the plate member 35 at the end of arm 33. As indicated in Fig. 3, the equalizer bar 37, when parallel to the ground, is spaced from and confined by both upper and lower pairs of lugs 40. In the view shown in Fig. 3, due to changes in ground contour, the outer earth working tool 31 carried by the beam 26 is operating at a slightly higher level than the laterally inner shovel 21 carried by the beam 18. The equalizer bar 37 is thus at an angle to the horizontal and has engaged diagonally opposite lugs or projections 40 on the plate member 35. These lugs thus serve as stops to accommodate and limit relative movement of the laterally spaced tool carrying units. These lugs likewise function when raising the implement to transport and engagement of the laterally inner gang with the undercarriage of the tractor body to limit the additional upward movement of the laterally outer earth working unit.

It is believed that the tractor-mounted cultivator of this invention and the operation thereof will be clearly understood from the foregoing description. It should likewise be understood that modifications may be made in the invention without departing from the spirit thereof or the scope of the appended claims.

What is claimed is:

1. In a tractor mounted cultivator, a transverse tool bar on the tractor, a pair of laterally spaced tool-carrying beams mounted on the tool bar for independent pivoting relative thereto, a transverse equalizer bar connecting said beams, a lift arm pivotally mounted on the tool bar between the beams and independently thereof, means connecting the equalizer bar to the lift arm for moving the beams between operating and transport positions comprising a socket member carried by the lift arm, and means for mounting the equalizer bar in the socket member medially of its ends for rocking movement about a longitudinal axis to accommodate independent vertical movement of the beams, said socket having parts engageable with the bar after a predetermined rocking thereof to limit the relative vertical movement of the beams.

2. In a tractor mounted cultivator, a transverse tool bar on the tractor, a pair of laterally spaced tool-carrying beams mounted on the tool bar for independent pivoting relative thereto, a transverse equalizer bar connecting said beams, a lift arm pivotally mounted on the tool bar between the beams and independently thereof, means connecting the equalizer bar to the lift arm for moving the beams between operating and transport positions comprising a socket member carried by the lift arm, means for mounting the equalizer bar in the socket member medially of its ends for rocking movement about a longitudinal axis to accommodate independent vertical movement of the beams, said socket having parts engageable with the bar after a predetermined rocking thereof to limit the relative vertical movement of the beams and spring means reacting against the lift arm and bar to bias the tool beams to operating position.

3. In an agricultural implement adapted to be mounted upon the side of a tractor and including laterally spaced earth working units one of which is adjacent the tractor and extends at least partly under the tractor body and engages the under side thereof when the implement is raised to transport position, a supporting frame secured to the tractor and extending laterally therefrom, means for pivotally mounting said units on the frame on transverse axes for relative vertical movement thereof, lifting mechanism for moving the units simultaneously between operating and transport positions including means for imparting additional movement to the laterally outer unit after the inner unit has engaged the under side of the tractor, said lifting mechanism comprising a transverse member pivotally connected at one of its ends to one of said units and at its other end to the other of said units and providing for relative vertical movement thereof about their axes on said frame, a lift arm on said frame, means serving as a pivot pin carried by said arm, and a pivotal connection medially of its ends between said transverse member and said pin accommodating rocking of the member about a longitudinal axis.

4. In an agricultural implement adapted to be mounted upon the side of a tractor and including laterally spaced earth working units one of which is adjacent the tractor and extends at least partly under the tractor body and engages the under side thereof when the implement is raised to transport position, a supporting frame secured to the tractor and extending laterally therefrom, means for pivotally mounting said units on the frame on transverse axes for relative vertical movement thereof, lifting mechanism for moving the units simultaneously between operating and transport positions including means for imparting additional movement to the laterally outer unit after the inner unit has engaged the under side of the tractor, said lifting mechanism comprising a transverse member pivotally connected at one of its ends to one of said units and at its other end to the other of said units and providing for relative vertical movement thereof about their axes on said frame, a lift arm on said frame, means serving as a pivot pin carried by said arm, a pivoted connection medially of its ends between said transverse member and said pin accommodating rocking of the member about a longitudinal axis and stops carried by said lift arm limiting the pivotal movement of said member.

5. In an agricultural implement adapted to be mounted upon the side of a tractor and including laterally spaced earth working units one of which is adjacent the tractor and extends at least partly under the tractor body and engages the under side thereof when the implement is raised to transport position, a supporting frame secured to the tractor and extending laterally therefrom, means for pivotally mounting said units on the frame for relative vertical movement thereof, lifting mechanism for moving the units simultaneously between operating and transport positions including means for imparting additional movement to the laterally outer unit after the inner unit has engaged the under side of the tractor, said lifting mechanism comprising a transverse member connecting said units and providing for relative vertical movement thereof about their axes on said frame, a lift arm on said frame, said lift arm having at its free end a broad vertical face portion having vertically spaced projections thereon, a central pivot pin projecting from said face portion, and a pivoted connection medially of its ends between said transverse member and said pin accommodating rocking of the member about a longitudinal axes, said projections being spaced above and below said member to serve as stops limiting the rocking of said member.

References Cited in the file of this patent

UNITED STATES PATENTS

| | | |
|---|---|---|
| 1,643,153 | Dennis | Sept. 20, 1927 |
| 2,239,332 | Mee | Apr. 22, 1941 |
| 2,603,138 | Rafferty | July 15, 1952 |